April 27, 1943. H. N. SMITH 2,317,414
LAMINATED TOBOGGAN
Filed Oct. 28, 1941
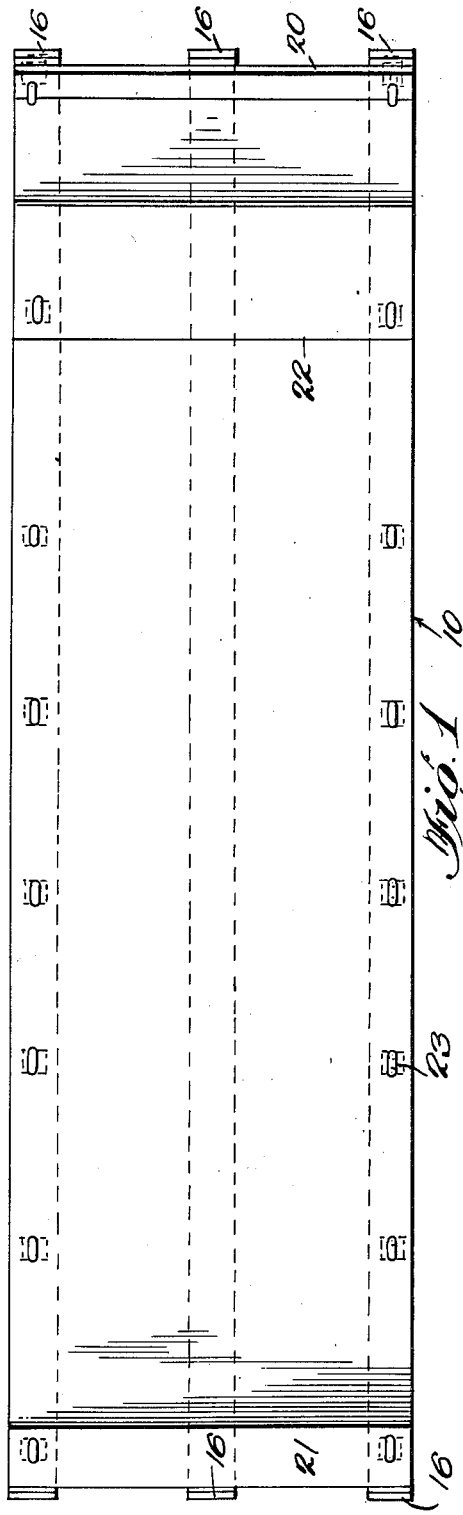
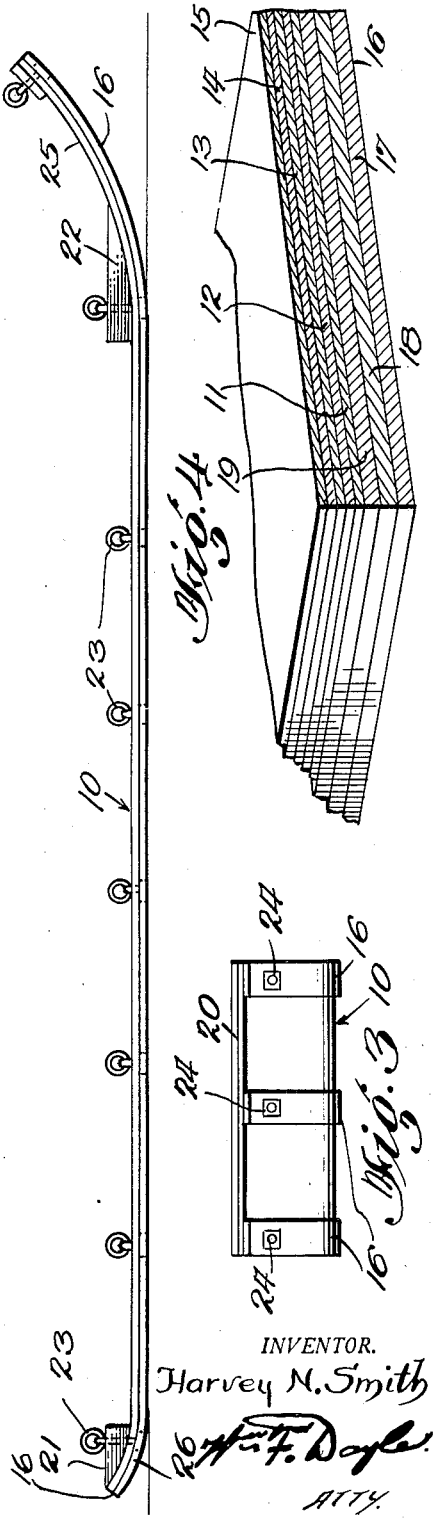
INVENTOR.
Harvey N. Smith Patented Apr. 27, 1943

2,317,414

UNITED STATES PATENT OFFICE 2,317,414

LAMINATED TOBOGGAN

Harvey N. Smith, Washington, D. C.

Application October 28, 1941, Serial No. 416,807

2 Claims. (Cl. 280—18)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to toboggans and more particularly to laminated toboggans.

An object of this invention is to provide a toboggan which is curved upward at both ends so that the toboggan will slide freely in the snow forward or backward along the line of its longitudinal axis.

Another object of this invention is to provide a toboggan that will be strong, light and cheap to manufacture.

A further object of this invention is to provide a toboggan composed of two or more layers of wood so arranged that the grains of the layers will run in opposite directions to each other and all layers are adapted to be held together by a well-known plastic or the like.

A further object of this invention is to provide a toboggan which is provided with compressed plasticized laminated runners which are waterproof and extremely wear-resistant.

With the accomplishment of the above and other related objects and advantages in view, the invention consists of features of construction, arrangement and operation of parts which will appear later in the specification.

While the preferred embodiment of the invention is shown, it will be understood that slight changes in form and minor details of construction may be resorted to without departing from the spirit of the invention and fall beyond the scope of the claims.

In order that the invention may be better understood, reference will now be made to the drawing in which similar characters and references in the several figures indicate identical parts.

Fig. 1 is a top plan view of the toboggan embodying the invention.

Fig. 2 is a side elevation of the same.

Fig. 3 is a front elevation.

Fig. 4 is a fragmentary sectional view showing the laminations at the runner.

Reference now being made to the drawing by numeral, 10 indicates the toboggan which consists of an under layer 11 the grain of which runs lengthwise of the toboggan, layer 12 so arranged so that the grain thereof runs at right angles to the layer 11, layer 13 which has the grain running in the same direction as layer 11, layer 14 which has the grain running in the same direction as layer 13 and layer 15 which has the grain running in the same direction as layers 11 and 13.

As also shown in Fig. 4 runners 16 are composed of three layers 17, 18 and 19 and the grain of these layers runs in the same manner as the grain of the layer of the toboggan proper.

The runners 16 are thoroughly impregnated with plastic and placed in a hot press and compressed to any desired thickness. During experimentation these runners have been compressed as much as 50% but the invention should not be limited to this amount. It is also adaptable to compress the runners at the same time the runners are impregnated with the plasticizing material. The plasticizing of the runners will produce a smooth, highly-polished surface which is adapted to glide very freely over the snow. After the runners have been impregnated, the toboggan and runners are united as a unit by the same plasticizing material, which can be phenolaldehyde or urea formaldehyde without the use of an extender or filler.

The forward end of the toboggan is reinforced by cross bar 20 at the end of the forward sweep and the rear end of the toboggan is reinforced at the end of the rearward sweep by a cross bar 21 and another reinforcing cross bar 22 is placed at the beginning of the forward sweep. Ring eyebolts 23 are provided along each side of the toboggan to anchor tie ropes and drag lines.

The ring eyebolts are held in place by nuts 24 and the runners 16 are countersunk so that when the nuts are securely threaded onto the eyebolts they will be flush with the runner.

At present the toboggans in use are provided only with a forward sweep so that the toboggan will slide in only one direction, but the invention contemplates a toboggan having a forward sweep 25 and a rearward sweep 26. These provide a toboggan that will slide forward as well as rearward along the line of its longitudinal axis.

There is thus provided a toboggan which is light, strong and which will glide easily over the terrain due to the fact that the toboggan as a unit has been bound together by a plastic which forms a hard smooth surface.

It will be understood therefore by those skilled in the art that various changes and modifications than those already pointed out may be made without departing from the spirit of the invention and since the embodiment disclosed herein is only illustrative of the device, the invention is not to be understood as restricted thereto since they may be modified within the scope of the appended claims without departing from the spirit or scope of the invention.

Having thus described the invention, what is claimed as new and desired to secure by Letters Patent is:

1. A toboggan having front and rear sweeps, said toboggan being constructed of two or more layers of wood so arranged that the grain of the layers lies at right angles to each other, laminated compressed plasticized runners running lengthwise of the toboggan, reinforcing means secured to the toboggan at the beginning of the front and rear sweeps, the layers and runners of said toboggan being united by a plastic.

2. A toboggan having front and rear sweeps, said toboggan being constructed of two or more layers of wood so arranged that the grain of the layers lies at right angles to each other, laminated compressed plasticized runners running lengthwise of the toboggan, reinforcing means secured to the toboggan at the beginning of the front and rear sweeps, the layers and runners of said toboggan being united by a plastic, ring eyebolts placed along the linear edge of the toboggan, and holding means for said eyebolts being countersunk into the toboggan so that said holding means lie flush with said runners.

HARVEY N. SMITH.